(12) United States Patent
Lim et al.

(10) Patent No.: US 10,341,609 B1
(45) Date of Patent: Jul. 2, 2019

(54) GROUP VIDEO SYNCHRONIZATION

(71) Applicant: MOTOROLA SOLUTIONS, INC, Chicago, IL (US)

(72) Inventors: Bing Qin Lim, Jelutong (MY); Chew Yee Kee, Alor Setar (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/873,029

(22) Filed: Jan. 17, 2018

(51) Int. Cl.
*H04N 7/14* (2006.01)
*H04W 4/10* (2009.01)
*H04W 76/45* (2018.01)
*H04L 29/06* (2006.01)

(52) U.S. Cl.
CPC .............. *H04N 7/147* (2013.01); *H04W 4/10* (2013.01); *H04W 76/45* (2018.02); *H04L 65/403* (2013.01); *H04N 2007/145* (2013.01)

(58) Field of Classification Search
None
See application file for complete search history.

(56) References Cited

U.S. PATENT DOCUMENTS

| 6,930,994 | B1* | 8/2005 | Stubbs ................... H04N 7/148 370/348 |
| 7,899,193 | B2 | 3/2011 | Bekiares et al. |
| 8,792,473 | B2 | 7/2014 | Bekiares et al. |
| 2007/0002836 | A1* | 1/2007 | Lindner ................. H04W 4/10 370/352 |
| 2015/0057040 | A1 | 2/2015 | Kuehner |
| 2015/0326635 | A1* | 11/2015 | Yarygin ................ H04L 65/608 709/219 |
| 2016/0072862 | A1* | 3/2016 | Bader-Natal ............ H04N 7/15 715/755 |

* cited by examiner

*Primary Examiner* — Lonnie V Sweet

(57) ABSTRACT

A method and apparatus for synchronizing group video is provided herein. Upon a triggering event, users viewing a video over an LTE network will transmit synchronization information (e.g., a frame number, or a time stamp of the video frame, . . . , etc.) over an LMR and/or LTE network. In response, user devices will synchronize to the same spot in the video.

5 Claims, 5 Drawing Sheets

GROUP VIDEO SYNCHRONIZATION

BACKGROUND OF THE INVENTION

With body-worn cameras becoming ubiquitous, the amount public-safety officers sharing and viewing video is becoming more-and-more common. Video shared among officers is typically accomplished by utilizing a broadband over-the-air network, such as a Long-Term-Evolution (LTE) network capable of achieving large data rates. Due to differing channel conditions between users, viewers may be receiving the video at different latencies (based on, for example, LTE signal conditions at each user). In addition, users may pause and resume video, resulting in viewers simultaneously watching different parts of the same video.

Consider the fact that voice communications through a Land Mobile Radio (LMR) among public-safety officers are instantaneous, and carried on a different network than the broadband network. Thus, voice communications among public-safety officers are instantaneous, while video shared among officers may be delayed (differently for each officer). Thus, when all receivers of video are discussing (via LMR) subject matter in the video, the receivers may not all be viewing the video (via LTE) at the same spot. Furthermore, the user who is live recording (e.g. using body worn camera) and uploading the live video will not have the same view with the downloading user who is receiving the video with network latency. This can lead to confusion among officers as they discussing subject matter in the video.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for synchronizing group video is provided herein. Upon a triggering event, users viewing a video over an LTE network will transmit synchronization information (e.g., a frame number, or a time stamp of the video frame, . . . , etc.) over an LMR and/or LTE network. In response, user devices will synchronize to the same spot in the video.

The triggering event may be a Push-to-Talk (PTT) event. More particularly, a user viewing the video may initiate a voice transmission by pressing a PTT button on a PTT device. Push-to-talk (PTT) devices are commonly employed by public safety personnel, air traffic controllers, emergency workers, construction site workers, and others who need to be in constant and readily available voice communication. PTT, also known as press-to-transmit, is a method of communicating using half-duplex communication. A PTT button may be pressed to switch a device from a voice reception mode to a transmit-mode. For example, one operator may depress the PTT button on her device and speak into the device's microphone. The speech is converted into an appropriate format and transmitted to one or more other devices over the LMR network, where the operators of those other devices hear the first operator speak through their device's speaker. Depressing a PTT button may serve as a triggering event that causes synchronization information to be transmitted over an LMR network.

In another embodiment of the present invention, the triggering event may comprise a touch to a touchscreen. More particularly, if a touchscreen detects a touch to a particular video that is being watched at that moment, this may trigger synchronization information to be transmitted over an LMR network, so that all the public safety officers who are also watching (or recording) the same video will be synchronized to the same video frame.

Figure 1:
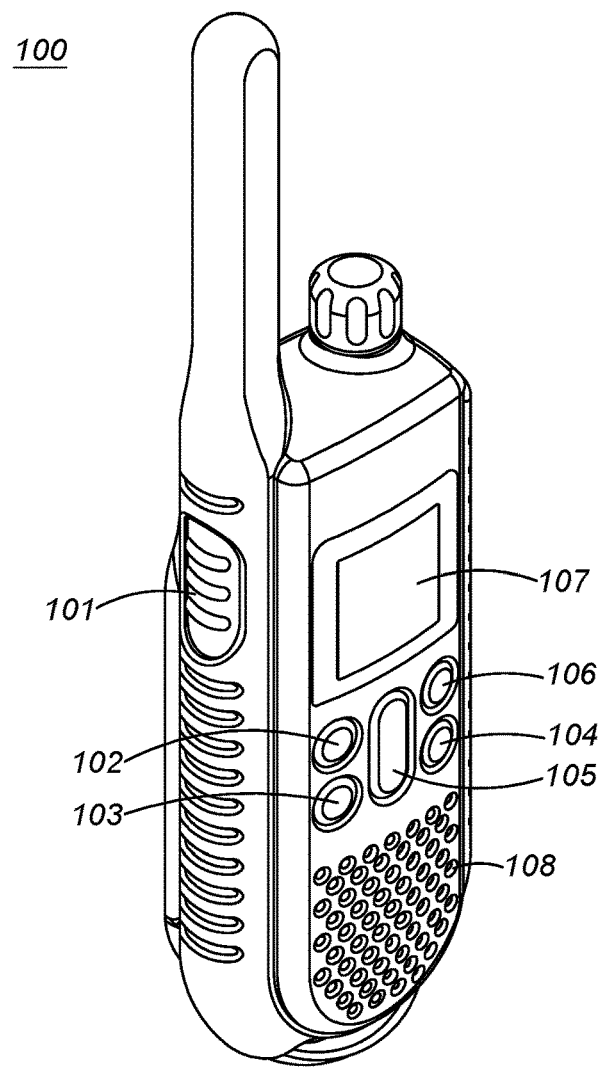
FIG. 1 illustrates push-to-talk (PTT) radio.

FIG. 1 illustrates push-to-talk (PTT) radio 100. As shown, radio 100 comprises PTT button 101, user interface buttons 102-106, touchscreen 107, and speaker 108. PTT button 101 comprises a standard button, that when pressed, transitions radio 100 from a listening state, to a transmit state.

Interface buttons 102-106 serve as means for controlling and/or programming radio 100. More particularly, buttons 102-106 serve as a man-machine interface, and are used for controlling radio 100. In some PTT radio embodiments, these other buttons may not be present, and may be replaced with a touch display interface. Buttons 102-106 may activate such features as backlights on radio 100, locking radio 100, logging on and off of radio 100, . . . , etc.

Touchscreen 107 comprises a way of displaying video to the user as well as receiving a touch event that may trigger synchronization information to be transmitted over the LMR or broadband network. Thus, display 107 may comprises a touch-screen display that provides both an output interface (visual) and an input interface between the device and a user.

Speaker 108 comprises a standard speaker/microphone combination for outputting and receiving audio. More particularly, speaker 108 converts an electrical signal generated from an active application to human-audible sound waves, and vice versa.

Figure 2:
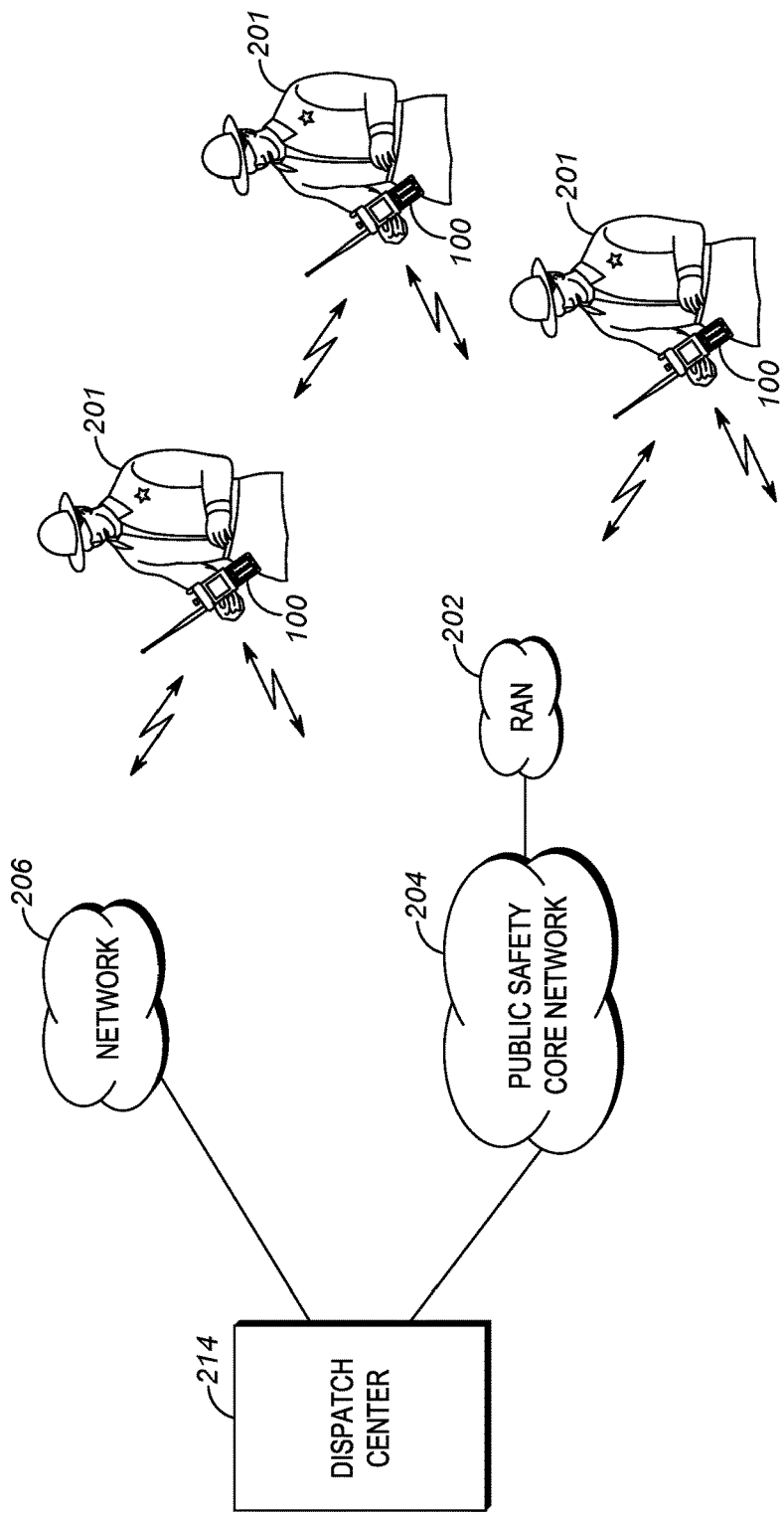
FIG. 2 is a general operating environment for the present invention.

FIG. 2 is a general operating environment for the present invention. The operating environment includes one or more public-safety radio access networks (RANs) 202, a public-safety core network 204, device 100, broadband network 206, and computer 214. In a preferred embodiment of the present invention, computer 214 serves as a public-safety dispatch center 214.

Communication between dispatch center 214 and device 100 via a first high-speed data link takes place through intervening network 206 such as, but not limited to a cellular communication system or broadband network system. Communication between dispatch center 214 and device 100 via a second low-speed (narrowband) link takes place through intervening network 204, such as, but not limited to one employing any number of public-safety protocols. Thus, as shown in FIG. 2, two separate networks exist, namely public-safety core network 204 (e.g., TETRA, P25, Firstnet, . . . , etc.), and public network 206 (e.g., LTE, WIFI, Verizon, Sprint, AT&T, . . . , etc.).

Each RAN 202 includes typical RAN elements such as base stations, base station controllers (BSCs), routers, switches, and the like, arranged, connected, and programmed to provide wireless service to user equipment (e.g., device 100 operated by officer 201) in a manner known to those of skill in the relevant art.

In a similar manner, network 206 includes elements such as base stations, base station controllers (BSCs), routers, switches, and the like, arranged, connected, and programmed to provide wireless high-speed data to user device 100 in a manner known to those of skill in the relevant art.

The public-safety core network 204 may include one or more packet-switched networks and/or one or more circuit-switched networks, and in general provides one or more public-safety agencies with any necessary computing and communication needs, transmitting any necessary public-safety-related data and communications.

Finally, computer 214 is part of a computer-aided-dispatch center, manned by an operator. For example, computer 214 typically comprises a graphical user interface that provides the dispatch operator necessary information about public-safety incidents.

During operation, device 100 is capable of sending, and/or receiving video via network 206, and also capable of sending and/or receiving voice communications via network 204. As one of ordinary skill in the art will recognize, voice and video transmitted from one user 201 to another user 201 will take place by uploading the video through the appropriate network, which then transmits the voice/video as part of a downlink transmission to various users. In a further embodiment of the present invention, peer-to-peer transmissions may take place among users, bypassing all networks.

As, discussed, voice transmission/reception is instantaneous (or for all practical purposes, instantaneous), while video may lag in time due to, for example, the size of the video file, network conditions, operator pausing, operator rewinding, . . . , etc. Thus, when all receivers of video are discussing subject matter in the video through network 206, the receivers may not all be viewing the video at the same spot. This can lead to confusion among the viewers.

In order to address this issue, radio 100 is capable of both receiving, and transmitting synchronization information to other radios 100. The synchronization information is transmitted to the other radios 100 by uploading the information to an appropriate network, where it is then transmitted via downlink communications to the other radios. When a radio 100 receives such synchronization information, it will advance or retard the video accordingly. All the public safety officers who are viewing that particular video (i.e., all officers viewing the same video), and receive the synchronization information, will have their video jump to the particular video frame that associated with the synchronization information.

If the device that receives the synchronization information is the device that is recording the video at the moment, the video frame that associated with the synchronization information will be displayed on the device or alternate device (e.g. head mounted display, smart glasses, smart watch etc) that is connected through a personal area network.

In one embodiment, after synchronization information is received, the video is advanced or retarded to match the spot identified in the synchronization information and the video is paused until a release trigger is received. The release trigger may comprise a touch gesture being release from the touch screen, de-key or release the PTT button, or a certain timeout from the trigger (e.g. 5 seconds after PTT received). The video may then resume at the previously viewed video frame.

In another example, the particular video frame will not pause but continue play from the particular spot identified in the synchronization information until the trigger is released or a timeout occurs.

Synchronization information comprises information such as, but not limited to a frame number, a time, a timestamp, a video identifier, and/or trigger dismissal information. Trigger dismissal information comprises such information as to inform a device of a release of PTT button, or a release of finger touch from the touch screen. As discussed above, the triggering event may comprise keying of the PTT button on radio 100, or simply touching the touchscreen of radio 100. A trigger release event may comprises the de-keying of the PTT button on radio 100, or removing a touch from touchscreen of radio 100.

Figure 3:
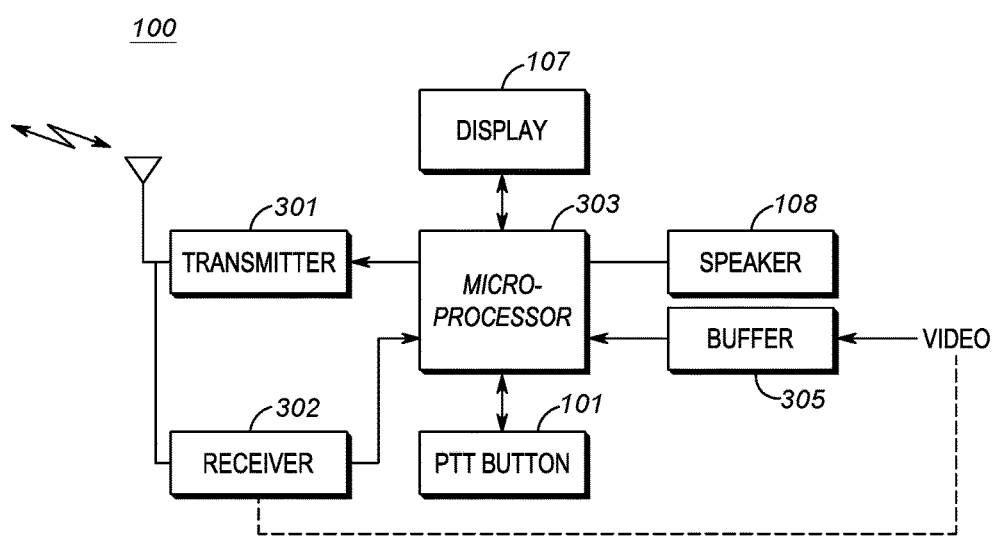
FIG. 3 is a block diagram of the radio of FIG. 1.

FIG. 3 is a block diagram of the radio of FIG. 1. As shown, radio 100 may include transmitter 301, receiver 302, display 107, logic circuitry (processor) 303, PTT button 101, speaker 108, and buffer 305. In other implementations, radio 100 may include more, fewer, or different components.

Transmitter 301 and receiver 302 are configured to operate using well known network protocols. For example, transmitter 301 and receiver 302 may utilize a high-data-rate network protocol when transmitting and receiving video through network 206, and utilize a public-safety protocol when transmitting and receiving voice communications over network 204. In order to accomplish this, transmitter 301 and receiver 302 may contain multiple transmitters and receivers, to support multiple communications protocols simultaneously.

Logic circuitry 303 comprises a digital signal processor (DSP), general purpose microprocessor, a programmable logic device, an Application Processor, or application specific integrated circuit (ASIC) and is utilized to control video displayed on display 107 based on a user making contact to PTT button 101 or display 107. Logic circuitry 303 is also utilized to determine and transmit synchronization information, and to receive synchronization information. Logic circuitry 303 will also determine if a currently-watched video needs to be advanced or retarded based on receiving synchronization information. More particularly, if logic circuitry 303 receives synchronization information, it will determine a spot within a currently-watched video that has been identified by the synchronization information. It will then cause the video to advance or retard to the identified spot. If synchronization information is broadcast to users of the system that may be watching different videos (or not watching videos), then logic circuitry 303 may detect a video identification from the synchronization information in order to make sure that the currently-watched video is one identified in the synchronization information.

During operation, video is input into buffer 305, and output from buffer 305 to logic circuitry 303. Such video may be encoded in one of many formats known in the art (e.g., MPEG, H.264/AVC (.MKV, .MP4, .MOV), H.265/HEVC (.MKV, .MP4, .MOV); VP9 (.MKV), . . . , etc.). As one of ordinary skill in the art will recognize, buffer 305 comprises memory that is read by logic circuitry 303 in a first-in-first-out manner. As discussed above, the video output from buffer 305 may be delayed. The delay causes short pauses, or jitter, in the video that causes a lag in the video that can accumulate as the video is continuously played and paused. Because of this, each radio in the system may be viewing the same video, however, the video may be at different spots (scenes) due to the differing delays acquired by each radio 100.

The video input into buffer 305 may originate from any source. Some common sources are video received from other users body cameras, video received from surveillance cameras, internal video stored in memory (not shown in FIG. 3), video received from a dispatch center, . . . , etc.

Logic circuitry 303 pulls video from buffer 305, properly decodes the video, displays the video on display (touchscreen) 107 and outputs audio (if any) to speaker 108. As the user of device 100 watches the video, they may wish to comment on a particular portion of the video (e.g., comment on a getaway vehicle, comment on a weapon, comment on a person of interest, . . . , etc.). When the user pushes PTT button 101 to make such a comment, logic circuitry will properly encode the voice and transmit it to members of a talkgroup using transmitter 301 (via public-safety network 204).

As discussed above, when using a PTT button press as a trigger, logic circuitry 303 will also send synchronization information to others upon detection of a PTT-button press. More specifically, when a PTT button press is detected (PTT trigger detected), a current frame number (or time/timestamp) of video, and associated video identifier is obtained. The current frame number (or time/timestamp) comprises the current video frame number or current video time of video being sent to display 107. The Video identifier comprises an identity of the particular video, and is used to verify if the receiver device is currently playing or recording the same video associated with the synchronization information.

The synchronization information may be transmitted over either network 204 or 206, but preferably transmitted over network 204 due to its substantially instantaneous nature. When transmitting the synchronization information over high-speed data network 206, the information may be uploaded (transmitted) as standard data over the network, and received (downloaded) by those users viewing the current video (i.e., transmitter and receivers are viewing the same video). In a similar manner, when transmitting the synchronization information over public-safety core network 204, the information may be transmitted (uploaded) as an LMR data packet, or as a modulated, sub-audible tone that is not audible to the human ear, and received (downloaded) by those users viewing the current video.

Regardless of what network is used to transmit the synchronization information, such information will preferably only be transmitted to users on a same talkgroup as the user sending the synchronization information. More particularly, modern two-way radio systems feature talkgroup creation where it is possible for a radio to be a member of any combination of talkgroups. As a member of a talkgroup, a radio may receive transmissions from, as well as transmit to all members of the talkgroup. Transmission and reception of information to radios outside of an assigned talkgroup is generally not performed. Illustratively, a radio assigned to an ambulance may be a member of a Fire & Rescue talkgroup as well as a Law Enforcement talkgroup. Therefore, the radio may communicate with all members of the Fire & Rescue talkgroup as well as the Law Enforcement talkgroup.

When radio 100 transmits synchronization information, it will only transmit such information to members of a current talkgroup in which radio 100 is a member.

Only devices using a same talkgroup as the user sending the synchronization information will receive the synchronization information. This is accomplished by radio 100 sending a talkgroup identification along with information transmitted over network 204. The talkgroup members who are viewing and/or recording the same video will be synchronized to the same video frame based on the synchronization information, and those talkgroup members who are not viewing any video or viewing other video on their device will not have their video synchronized to the video frame based on the synchronization information.

Figure 4:
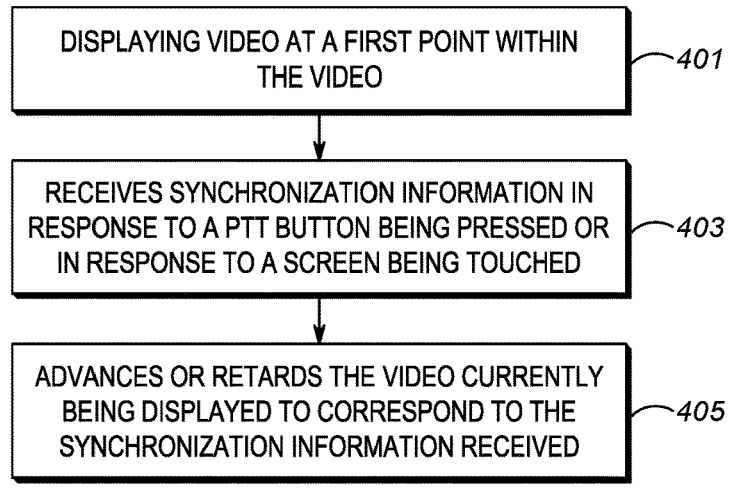
FIG. 4 is a flow chart showing operation of the radio of FIG. 3.

FIG. 4 is a flow chart showing operation of radio 100 when receiving synchronization information. The logic flow begins at step 401 where display 107 is currently displaying video at a first point within the video (e.g., a first time, a first frame number, . . . , etc.). At step 403, receiver 302 receives synchronization information. As discussed above, the received synchronization information is in response to a PTT button being pressed on another radio, or a touchscreen being touched on another radio. Along with the synchronization information, a push-to-talk transmission (voice transmission) may be received as well. As discussed, the synchronization information may be received over network 204 or network 206.

In response to the synchronization information being received, logic circuitry 303 advances or retards the video currently being displayed to correspond to the synchronization information received (step 405). The video is advanced or retarded to a second point within the video.

As discussed above, an indication that the PTT button was released may be received by receiver 301, or an indication that the press to the touchscreen has been released may be received by receiver 301. When this happens, logic circuitry 303 may instruct display 107 to return the video to the first point.

FIG. 4 provides for an apparatus comprising a Push-to-Talk (PTT) button, a display for displaying video, an over-the-air receiver(s) configured to receive a push-to-talk transmission along with first synchronization information, and an over-the-air transmitter(s) configured to transmit second synchronization information. Logic circuitry is provided and configured to receive the first synchronization information and advance or retard the video based on the first synchronization information, and also configured to receive a trigger that the PTT button was pressed, and in response to the received trigger, determine the second synchronization information of the video, and instruct the transmitter to transmit the second synchronization information via an over-the-air transmission to other radios.

Figure 5:
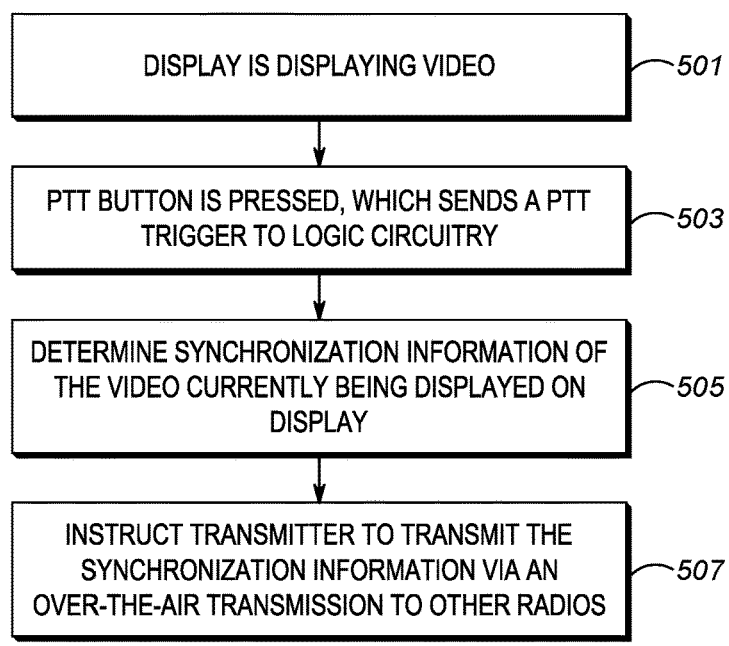
FIG. 5 is a flow chart showing operation of the radio of FIG. 3.

FIG. 5 is a flow chart showing operation of radio 100 when transmitting synchronization information. The logic flow begins at step 501 where display 107 is displaying video. As discussed, this video may be stored internally in storage, may be received over-the-air from receiver 302, and/or may be received from an external camera such as a body-worn camera. Regardless of where the video is received, at step 503 PTT button 101 is pressed, which sends a PTT trigger to logic circuitry 303. In response to receiving the PTT trigger, logic circuitry 303 determines synchronization information of the video currently being displayed on display 107 (step 505) and instructs transmitter 301 to transmit the synchronization information via an over-the-air transmission to other radios (step 507).

As discussed above, the synchronization information comprises a frame number, a timestamp, and/or a video identifier. Additionally, once logic circuitry 303 determines that the PTT button has been released, this information may be transmitted to other radios so that the other radios may resume their video where the video was originally (prior to receiving the synchronization information).

The above logic flow provides for an apparatus comprising over-the-air transmitter 301, display 107 for displaying video, and PTT button 101 for initiating an over-the-air voice transmission. Logic circuitry 303 is provided and configured to receive a trigger that the PTT button was pressed, and in response to the received trigger, determine synchronization information of video currently being displayed on the display, and instruct the transmitter to transmit the synchronization information via an over-the-air transmission to other radios.

Logic circuitry 303 may additionally determine that the PTT button was released, and instruct the transmitter to transmit PTT release information to the other radios. Additionally, receiver 302 is provided to receive video. As discussed above, over-the-air video may be received by the receiver over a first over-the-air network (e.g., an LTE network) and the synchronization information may be transmitted by transmitter 301 over a second over-the-air network (e.g., a narrowband public-safety network).

Figure 6:
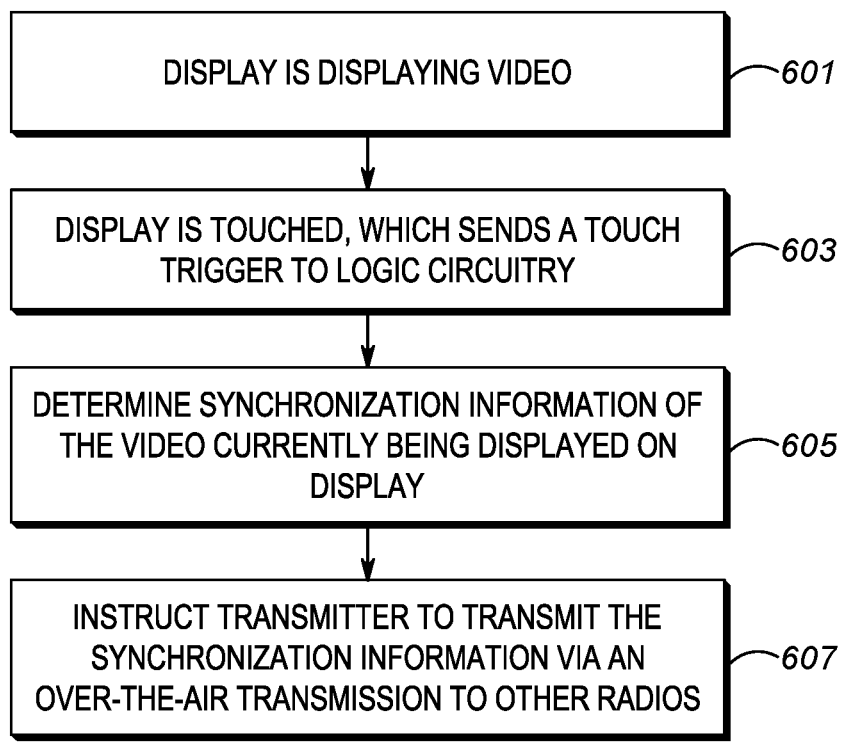
FIG. 6 is a flow chart showing operation of the radio of FIG. 3.

As discussed above, instead of a PTT trigger being used to initiate transmission of synchronization information, a touch to a display may be utilized. This is illustrated in FIG. 6. The logic flow begins at step 601 where display 107 is displaying video. As discussed, this video may be stored internally in storage, may be received over-the-air from receiver 302, and/or may be received from an external camera such as a body-worn camera. Regardless of where the video is received, at step 603 a touch is received on display 107, which send a touch trigger to logic circuitry 303. In response to receiving the touch trigger, logic circuitry 303 determines synchronization information of the video currently being displayed on display 107 (step 605) and instructs transmitter 301 to transmit the synchronization information via an over-the-air transmission to other radios (step 607).

As one of ordinary skill in the art will recognize, during standard police activity, many radios may be viewing video, with the users of each radio actively discussing the content of the video. Therefore, a user of a radio may be discussing video content, and receiving discussions from others about the video content. Therefore, a radio will need to both send synchronization information to other radios when the user of the radio presses their PTT button, and receive synchronization information from other radios when the users of the other radios press their PTT buttons. Therefore, each radio comprises a Push-to-Talk (PTT) button, a display for displaying video, an over-the-air receiver(s) configured to receive a push-to-talk transmission along with first synchronization information, an over-the-air transmitter(s) configured to transmit second synchronization information, and logic circuitry configured to receive the first synchronization information and advance or retard the video based on the first synchronization information, and also configured to receive a trigger that the PTT button was pressed, and in response to the received trigger, determine the second synchronization information of the video, and instruct the transmitter to transmit the second synchronization information via an over-the-air transmission to other radios.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
a first Push-to-Talk (PTT) button;
a display configured to display video;
an over-the-air receiver(s) configured to receive a PTT audio transmission along with first video synchronization information, wherein the PTT audio transmission is initiated by a user pressing a second PTT button on a PTT radio, and wherein the PTT audio transmission is not part of the video;
an over-the-air transmitter(s) configured to transmit second video synchronization information;
logic circuitry configured to receive the first video synchronization information and advance or retard the video based on the first video synchronization information, and also configured to receive a trigger that the first PTT button was pressed, and in response to the received trigger, determine the second video synchronization information for the video, and instruct the transmitter to transmit the second video synchronization information via an over-the-air transmission to other radios.

2. The apparatus of claim 1 wherein the first and the second video synchronization information comprises a frame number, and timestamp, and/or a video identifier.

3. The apparatus of claim 1 wherein the receiver additionally receives PTT release information and advances or retards the video based on the PTT release information.

4. The apparatus of claim 1 wherein:
the video is received over a first over-the-air network and the first and the second video synchronization information is received/transmitted over a second over-the-air network.

5. The apparatus of claim 1 wherein the logic circuitry additionally determines that the PTT button was released, and instructs the transmitter to transmit PTT release information to the other radios.

* * * * *